(12) United States Patent
Weiser

(10) Patent No.: US 7,895,127 B2
(45) Date of Patent: Feb. 22, 2011

(54) RATING-BASED SORTING AND DISPLAYING OF REVIEWS

(76) Inventor: Anatoly S. Weiser, 3525 Del Mar Heights Rd., #295, San Diego, CA (US) 92130

( * ) Notice: Subject to any disclaimer, the term of this patent is extended or adjusted under 35 U.S.C. 154(b) by 996 days.

(21) Appl. No.: 11/529,907

(22) Filed: Sep. 29, 2006

(65) Prior Publication Data

US 2008/0097835 A1  Apr. 24, 2008

(51) Int. Cl.
 *G06Q 30/00* (2006.01)
(52) U.S. Cl. .................. 705/306; 705/7; 705/14.36; 705/14.66; 707/749; 707/752; 707/758; 709/203; 709/218; 709/250
(58) Field of Classification Search .............. 705/10, 705/14, 1.1, 306, 14.36, 14.66; 707/749, 707/752, 758; 709/203, 218, 250
See application file for complete search history.

(56) References Cited

U.S. PATENT DOCUMENTS

| | | | | |
|---|---|---|---|---|
| 5,748,973 | A  * | 5/1998 | Palmer et al. ................... | 704/9 |
| 6,064,979 | A  * | 5/2000 | Perkowski .................... | 705/26 |
| 6,466,918 | B1 * | 10/2002 | Spiegel et al. ................. | 705/27 |
| 6,963,867 | B2 * | 11/2005 | Ford et al. ................... | 707/752 |
| 7,031,952 | B1 * | 4/2006 | Heumann et al. .............. | 707/1 |
| 7,143,089 | B2 * | 11/2006 | Petras et al. ................. | 707/749 |
| 7,574,364 | B2 * | 8/2009 | Hasegawa et al. .............. | 705/1 |
| 7,596,578 | B1 * | 9/2009 | Marks ..................... | 707/104.1 |
| 7,599,882 | B2 * | 10/2009 | Cagan ......................... | 705/38 |
| 7,610,224 | B2 * | 10/2009 | Spiegel ........................ | 705/28 |
| 2002/0032776 | A1* | 3/2002 | Hasegawa et al. ........... | 709/225 |
| 2002/0165905 | A1* | 11/2002 | Wilson ........................ | 709/203 |
| 2005/0096764 | A1* | 5/2005 | Weiser .......................... | 700/94 |
| 2005/0114229 | A1* | 5/2005 | Ackley et al. ................. | 705/26 |
| 2005/0131866 | A1* | 6/2005 | Badros et al. .................. | 707/3 |
| 2006/0095404 | A1* | 5/2006 | Adelman et al. ............... | 707/3 |
| 2006/0143066 | A1* | 6/2006 | Calabria ...................... | 705/10 |
| 2006/0143158 | A1* | 6/2006 | Ruhl et al. ..................... | 707/3 |
| 2006/0230064 | A1* | 10/2006 | Perkowski ............... | 707/104.1 |
| 2006/0282328 | A1* | 12/2006 | Gerace et al. ................. | 705/14 |
| 2007/0136077 | A1* | 6/2007 | Hammond et al. ............. | 705/1 |
| 2007/0226374 | A1* | 9/2007 | Quarterman et al. ........ | 709/250 |
| 2008/0082499 | A1* | 4/2008 | Koski ............................ | 707/3 |
| 2008/0097835 | A1* | 4/2008 | Weiser ........................ | 705/14 |
| 2009/0037412 | A1* | 2/2009 | Bard et al. ..................... | 707/5 |
| 2009/0263778 | A1* | 10/2009 | Berger et al. ................ | 434/350 |

* cited by examiner

*Primary Examiner*—John G Weiss
*Assistant Examiner*—Adam Chornesky
(74) *Attorney, Agent, or Firm*—Anatoly S. Weiser, Esq.

(57) ABSTRACT

A computer system receives customer reviews for a subject, for example, a product, service, or market participant. Each review includes a rating of the subject and a comment about the subject. The rating may be favorable, unfavorable, or intermediate. The system sorts the reviews in a default order, for example, chronologically, and displays the reviews in the default order on a first webpage. The first webpage includes an input for requesting a non-default order of the reviews, for example, in accordance with the ratings of the reviews. The system sorts the reviews in the non-default order, and, when a user activates the input to request the reviews in the non-default order, displays a second webpage with the reviews in the non-default order. The non-default order may require all reviews with less than favorable ratings to be placed ahead of all reviews with favorable ratings. The system may be Internet-based.

17 Claims, 6 Drawing Sheets

Books 'N Stuff

WonderCam Opti101

Availability: In stock, ready for delivery

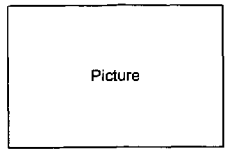

Price: $188.00 <u>Buy</u>

Technical description:
- 6.2-megapixel sensor captures enough detail for quality 12 x 17-inch prints
- 4.5x optical zoom; 2.7-inch LCD display
- Capture QuickTime movies (640 x 480) at 60 frames per second; built-in editing functions
- High-performance 0.3-second start-up and 0.1-second shutter lag
- Powered by Lithium-ion battery (battery and charger included); stores images on XSD memory cards

REVIEWS:

     Terrific Camera!     Reviewed by Glen Grant     Review Posted: Sep 26, 2006

I researched several cameras for my trip to Bora Bora. It came down to this one and DCF 1200, since I have been a big fan of WonderCam and previously owned two other cameras. Although packed with features, the price tag of DCF was too much. If you are like me, they look pretty much the same. However, let me point out several differences between the two cameras.

1) The Opti101 is the newest camera from WonderCam.

2) The Opti101 has 2.7" LCD screen, while the DCF has a 2.5" screen.

3) Both cameras have movie modes. But, the new Opti101 can record at 60fps!! That's great for those videos we all take on vacation. The max on the DCF is 30fps.

4) Then there is the built-in flash, additional user options, included 8 Gig XSD card, and lots of other stuff. There is simply no comparison.

     Love it     Reviewed by LeeAnn Ngu     Review Posted: Sep 18, 2006

I got this camera for my birthday 2 days ago, and just LUV it! Get one yourself.

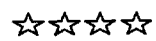     Small, lots of features     Reviewed by Kari Yambin     Review Posted: Sep 17, 2006

All I can say is WOW! More than meets my expectations. Why just four stars then? The ON/OFF switch is placed very awkwardly, so sometimes I turn the camera on or off when I don't mean to.

     What a deal!     Reviewed by Abe Timistic     Review Posted: Sep 16, 2006

There is no other camera with all those features for the price. And you get it from WonderCam, a company known for its wonderful (pun intended) customer service. I highly recommend it.

| 340 Show More Reviews – Current Sort | 350 Sort By Star Number -- Highest First | 360 Sort By Star Number -- Lowest First) |

FIG. 3A

Books 'N Stuff

WonderCam Opti101

Availability: In stock, ready for delivery

Price: $188.00 Buy

Technical description:
- 6.2-megapixel sensor captures enough detail for quality 12 x 17-inch prints
- 4.5x optical zoom; 2.7-inch LCD display
- Capture QuickTime movies (640 x 480) at 60 frames per second; built-in editing functions
- High-performance 0.3-second start-up and 0.1-second shutter lag
- Powered by Lithium-ion battery (battery and charger included); stores images on XSD memory cards

REVIEWS:

 Look elsewhere     Reviewed by Ann Happy     Review Posted: Sep 15, 2006

What's most important about electronics? That it work, of course. This one was dead out of the box. They exchanged it, but the new one died 6 weeks later, just outside of the free exchange period. So now I am stuck waiting for the warranty repair. I am not a happy camper.

 No image stabilizer     Reviewed by Rick Libin     Review Posted: Aug 1, 2006

A camera in this class should have image stabilization. This one does not. So, even with the modest optical zoom range provided, it's hard to take a decent picture at the top of the range. I returned mine.

 Not waterproof, not water resistant     Reviewed by Red Hatter     Review Posted: June 21, 2006

I took it to the pool and it got splashed with just the tiniest drop of water. It's dead now, and they won't replace it or fix it.

 Spend a little more on a real camera     Reviewed by Ted Fontana     Review Posted: May 16, 2006

I know this is no dSLR, but still, look at that shutter lag. I am not just talking about sports event photography, but every day picture taking. My niece was getting a new patch at the cub scout meeting, and I missed it because of the #$%%^ shutter lag. Do yourself a favor and get a real camera!

 Too big     Reviewed by C. Potamkin     Review Posted: May 1, 2006

You better have big pockets if you intend to carry this cam in them. Isn't it supposed to be portable?

 Proprietary batter with horrible capacity     Reviewed by Earl Adopter     Review Posted: March 20, 2006

Being the first one to review it, the only bad thing about the camera is that it uses a proprietary battery and the capacity of the battery is just horrible. 122 pics is all it was good for on the first charge.

| 340<br>Show More Reviews –<br>Current Sort | 350<br>Sort By Star Number --<br>Highest First | 360<br>Sort By Star Number --<br>Lowest First) |

FIG. 3B

RATING-BASED SORTING AND DISPLAYING OF REVIEWS

FIELD OF THE INVENTION

The present invention relates generally to apparatus, methods, and articles of manufacture for providing, searching through, and sorting of customer review information.

BACKGROUND

Many on-line businesses have thrived providing services and products, and facilitating customer decision-making by enabling customers and even non-customers to publish their opinions about products, services, suppliers of products and services, and purchasers of products and services. Amazon.com is one well-known example of a company using this business model. Amazon enables the users of its web portal to publish product reviews and product ratings. Another well-known example of review- and rating-based business model is eBay.com. This company enables an on-line marketplace where participants—both buyers and sellers—can rate each other based on the transactions conducted in that marketplace. Similarly, Nextag.com enables the users of its website to leave reviews and ratings for both sellers and products. Other examples of such services abound.

A large number of bad or even neutral ratings can be a kiss of death for a market participant, product, or service. On eBay, for example, buyers and sellers tend to shun those participants who have accumulated more than a small percentage of ratings that are less than "positive." It follows that even marginal participants have mostly good ratings. At the same time, it is practically impossible to maintain an unblemished record after having participated in a reasonable number of transactions: mistakes, disagreements, misunderstandings, and frustrated expectations all take place on occasion.

For many market participants, products, and services, large numbers of reviews and ratings are available. Indeed, for quite a few market participant, products, and services, ratings and reviews number in the thousands and even in the tens of thousands. Again, such reviews are likely to be overwhelmingly positive. When a consumer attempts to evaluate the reputation of a market participant based on the ratings and reviews, the consumer may need to sift through a large number of reviews to get to the negative review or reviews. This problem arises because the reviews are listed chronologically. The consumer may need to view page after page of positive ratings and reviews before finding a few negative or neutral ratings and reviews. Yet it is the negative (or less than positive) ratings that are likely to be most significant for evaluating trustworthiness. A similar problem exists when searching through certain product and service reviews and ratings.

It is desirable to improve ratings-based feedback sorting and display for online transactions.

SUMMARY

A need thus exists to facilitate the process of searching, sorting, and displaying on-line reviews based on feedback ratings. A need also exists for apparatus for facilitating on-line searching, sorting, and displaying of reviews based on feedback ratings. A need also exists for memories storing program code embodying steps for searching, sorting, and displaying on-line reviews based on feedback ratings.

Embodiments of the present invention are directed to methods, apparatus, and articles of manufacture that may satisfy one or more of these needs. In some embodiments, the invention herein disclosed is a computer-implemented method. In accordance with the method, a computer system, such as an Internet portal, receives from a plurality of customers reviews for a plurality of subjects, each subject of the plurality of subjects being selected from a group consisting of a product, a service, and a market participant, the plurality of subjects including a first subject. The customer reviews include a first plurality of reviews for the first subject. Each review of the first plurality of reviews includes a rating of the first subject and a comment associated with the first subject. The rating and comment may be submitted following the same transaction. The first plurality of reviews is sorted in a default order to obtain a default ordered first plurality of reviews. At least a first subset of the default ordered first plurality of reviews is displayed on a first display page. The first display page includes a first input for requesting a first non-default ordered display of the first plurality of reviews in accordance with a first non-default order, which is different from the default order. The first subset includes a plurality of contiguous reviews, for example, the top-ordered reviews that can fit on the first page. The system receives from a customer through the first input a first request for the first non-default ordered display of the first plurality of reviews, sorts the first plurality of reviews in the first non-default order to obtain a first non-default ordered first plurality of reviews, and, in response to the first request, displays on a second display page at least a second subset of the first non-default ordered first plurality of reviews, the second subset including a plurality of contiguous reviews. For example, the second subset includes top-ordered reviews that can fit on the second page.

In aspects of the invention, the default order is chronological beginning with the latest review, and the first non-default order is rating-based with a review having a most favored rating being ordered ahead of a review having a least favored rating.

In aspects of the invention, the default order is chronological beginning with the latest review, and the first non-default order is rating-based with a review having a least favored rating being ordered ahead of a review having a most favored rating.

In aspects of the invention, the first display page further includes a second input for requesting a second non-default ordered display of the first plurality of reviews in accordance with a second non-default order, the second non-default order being different from the default order and from the first non-default order.

In aspects of the invention, each rating in the first plurality of reviews is selected from a group consisting of a favorable rating selection and an unfavorable rating selection.

In aspects of the invention, each rating in the first plurality of reviews is selected from a group consisting of a first rating selection, a second rating selection, and a third rating selection. The first non-default order may be such that each review of the first plurality of reviews that has a first rating selection or a second rating selection is placed ahead of each review of the first plurality of reviews that has a third rating selection, and the reviews of the first plurality of reviews that have first or second rating selections are ordered chronologically.

In aspects of the invention, the second display page further includes a third input for requesting a second non-default ordered display of the first plurality of reviews in accordance with a second non-default order. The second non-default order is different from the default order and from the first non-default order. The method further includes, after the step of displaying the second display page, receiving through the third input a second request for the second non-default ordered display of the first plurality of reviews, sorting the first plurality of reviews in the second non-default order of the first plurality of reviews to obtain a second non-default ordered first plurality of reviews, and, in response to the second request, displaying at least a third subset of the second non-default ordered first plurality of reviews on a third display page, the third subset including a plurality of contiguous reviews.

In aspects of the invention, each rating in the first plurality of reviews is selected from a group that includes a mutually withdrawn rating selection. Mutually withdrawn reviews (i.e., reviews corresponding to the mutually withdrawn rating selection) result from agreement of two customers to withdraw their respective reviews of each other submitted after a transaction involving the two customers.

In some embodiments, a computer-implemented method of displaying data includes receiving a plurality of reviews relating to a subject, each review of the plurality of reviews comprising a user rating of the subject and a user comment associated with the subject, displaying the first plurality of reviews in a default order, and displaying the plurality of reviews in a non-default order in response to a customer request, the non-default order being different from the default order, the non-default order being based on the user ratings in the reviews. The non-default order may be such that reviews with unfavorable ratings are displayed before reviews with favorable ratings.

In aspects of the invention, one or more memory devices store computer code, wherein the code, when executed by at least one processor coupled to the Internet, configures the processor to perform the steps of any method described throughout this document.

In aspects of the invention, a computer system includes a memory device storing computer code, at least one processor coupled to the memory device so as to execute the computer code, and a network interface coupling the at least one processor to the Internet. The computer code, when executed by the at least one processor, configures the at least one processor to perform the steps of any method described throughout this document.

These and other features and aspects of the present invention will be better understood with reference to the following description, drawings, and appended claims.

BRIEF DESCRIPTION OF THE FIGURES

FIG. 3A illustrates an exemplary display of a page with user ratings and comments relating to a product, in accordance with selected embodiments of the present invention;

FIG. 3B illustrates an exemplary display of a page with the user ratings and comments relating to the product reordered in a non-default order, beginning with the least favorable ratings, in accordance with selected embodiments of the present invention.

DETAILED DESCRIPTION

Figure 1:
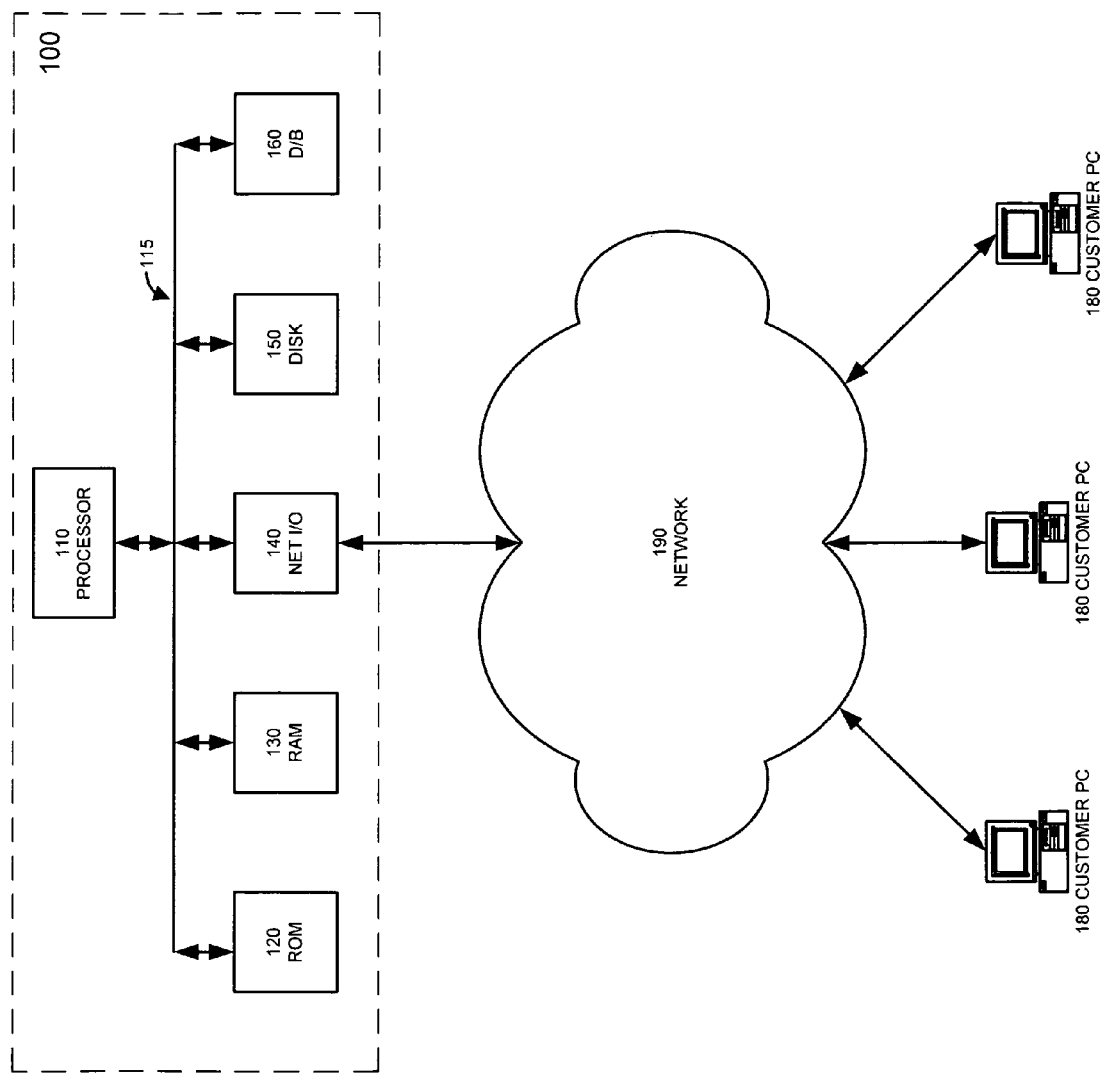
FIG. 1 illustrates selected components of a computer-based system configured to perform steps of methods for rating-based sorting and displaying of reviews, in accordance with selected embodiments of the present invention.

In this document, the words "embodiment" and "variant" refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar expressions and phrases are used to indicate one of a number of different possible embodiments. The number of possible embodiments is not necessarily limited to two or any other quantity. Characterization of an item as "exemplary" means that the item is used as an example. Such characterization of an embodiment does not necessarily mean that the embodiment is a preferred embodiment; the embodiment may but need not be a currently preferred embodiment. All embodiments are described for illustration purposes and are not strictly limiting.

The words "couple," "connect," and similar expressions with their inflectional morphemes do not necessarily import an immediate or direct connection, but include connections through mediate elements within their meaning.

Contiguous reviews of a subset of reviews means a plurality of reviews that are contiguous within the ordered plurality of reviews from which the subset is drawn. In other words, it means a continuous block of reviews drawn from the ordered set of reviews without changing the order of the reviews.

Causing to be displayed means taking action that results in displaying. For example, a server computer may cause a web page to be displayed by making the web page available for access by a client computer over a network, such as the Internet, which web page the client computer then displays to a user.

Other and further definitions and clarifications of definitions may be found throughout this document.

Reference will now be made in detail to several embodiments of the invention that are illustrated in the accompanying drawings. Same reference numerals are used in the drawings and the description to refer to the same apparatus elements and method steps. The drawings are in simplified form, not to scale, and omit apparatus elements and method steps that can be added to the described systems and methods, while possibly including certain optional elements and steps.

FIG. 1 is a simplified block diagram representation of a computer-based system 100 configured in accordance with selected aspects of the present invention. As shown in FIG. 1, the system 100 is coupled to customer computers 180 via a communication network 190. FIG. 1 does not show many hardware and software modules of the system 100, and omits several physical and logical connections. The system 100 may be implemented as a special purpose data processor, a general-purpose computer, a computer system, or a group of networked computers or computer systems configured to perform the steps of the methods described below. In some embodiments, the system 100 is built on a personal computer platform, such as a Wintel PC or a Mac computer. The personal computer may be a desktop or a notebook computer. The system 100 may function as a server computer. In some embodiments, the system 100 is implemented as a plurality of computers interconnected by a network, such as the network 190.

The system 100 includes a processor 110, read only memory (ROM) module 120, random access memory (RAM) module 130, network interface 140, a mass storage device 150, and a database 160. These components are coupled together by a bus 115. In the illustrated embodiment, the processor 110 is a microprocessor, and the mass storage device 150 is a magnetic disk drive. The mass storage device 150 and each of the memory modules 120 and 130 are connected to the processor 110 to allow the processor 110 to write data into and read data from these storage and memory devices. The network interface 140 couples the processor 110 to the network 190, for example, the Internet. The nature of the network 190 and of the devices that may be interposed between the system 100 and the network 190 determine the kind of network interface 140 used in the system 100. In some embodiments, for example, the network interface 140 is an Ethernet interface that connects the system 100 to a local area network, which, in turn, connects to the Internet.

The database 160 is used for organizing and storing data that may be needed or desired in performing the method steps described in this document. The database 160 may be a physically separate system coupled to the processor 110, as illustrated in FIG. 1. In one alternative embodiment, the processor 110 and the mass storage device 150 are configured to perform the functions of the database 160.

The processor 110 reads and executes program code instructions stored in the ROM module 120 and/or the storage device 150. Under control of the program code, the processor 110 configures the system 100 to perform the steps of the methods described throughout this document. In addition to the ROM module 120 and the storage device 150, the program code instructions may be embodied in other machine-readable storage media, such as additional hard drives, floppy diskettes, CD-ROMs, DVDs, Flash memories, and similar devices. The program code can also be transmitted over a transmission medium, for example, over electrical wiring or cabling, through optical fiber, wirelessly, or by any other form of physical transmission. The transmission can take place over a dedicated link between telecommunication devices, or through a wide- or local-area network, such as the Internet, an intranet, extranet, or any other kind of public or private network. In one embodiment, the program code is downloaded to the system 100 through the network interface 140.

In a variant of the illustrated embodiment, the system 100 functions as an auction server that enables users at the customer computers 180 to list items (products and/or services) for bidding, to place bids on the listed items, complete sales and purchases of the items, and provide reviews (including ratings and comments) regarding the items and other customers. Those skilled in the art are surely familiar with eBay.com auction website that performs such functions. In another variant of the illustrated embodiment, the system 100 functions as a server implementing an online store for selling items directly and acting as a sales intermediary for other stores. Those skilled in the art should be familiar with the Amazon.com website that performs such functions. In yet another variant of the illustrated embodiment, the system 100 acts as an information provider regarding products, services, and electronic commerce companies. Those skilled in the art are likely familiar with NexTag.com and CNET.com websites that perform such functions.

In an auction variant, the system 100 allows each user to provide ratings related to other auction participants with whom the user was involved in a transaction. The user can rate another participant favorably, unfavorably, or neutrally. Furthermore, mutually withdrawn ratings may be considered as a separate rating category, regardless of the original rating provided prior to withdrawal of the rating/review. Once again, those skilled in the art are familiar with the implementation of ratings by eBay.com. It should be noted, however, that the system 100 may enable the user to select from fewer or greater than three ratings. For example, the system 100 may enable the user to select from only two ratings, such as favorable and unfavorable. The system 100 may also enable the user to select from a plurality of intermediate ratings between the two extreme ratings. In some embodiments, the user may assign a rating number on a scale with great many gradations, such as a percentage scale from 0-100; indeed, the scale can be made continuous or almost continuous.

The system 100 also enables the users to provide alphanumeric comments associated with the ratings. The system 100 may require submission of a comment with each rating.

Various conditions may be imposed by the system 100 on provision of ratings and comments. For example, the user may be prevented from rating if the user has fewer than a predefined number of total transactions, fewer than a predefined number of transactions with predetermined recency (e.g., transactions within the last month or last year), or if the user's reliability is suspect for any other reason (e.g., the user's transactions resulted in a poor score for the user).

The system 100 stores the ratings using a database, which database may be implemented with the components of the system 100, or elsewhere. The database may be the database 160.

Figure 2A:
FIG. 2A illustrates an exemplary display of a page of a profile of a market participant, in accordance with selected embodiments of the present invention.

FIG. 2A illustrates an exemplary display of a first page of a profile of a user using a sobriquet or handle "ReliableSeller" on the auction site "!Auction Marketplace!" that may be implemented using the system 100. The profile includes ReliableSeller's ratings and information derivable from the ratings. In particular, the profile includes a name field 202 with the name of the user (ReliableSeller), a score field 204 with the reliability score of the user, and a user status field 206 (indicative of the user's special status, if any, assigned based on the high number or frequency of transactions). Here, score is calculated by subtracting the total number of unfavorable ratings from the total number of favorable ratings. In another variant, the score is calculated by subtracting the total value of all transactions with unfavorable ratings from the total value of all transactions. Of course, score can be calculated in a variety of other ways. The profile further includes an age field 208 showing when the user first registered with the auction site, a location field 210 showing the user's physical location, a current sort field 212 showing the criteria used to sort the ratings for the current display. As illustrated in FIG. 2, the ratings in a table 230 are sorted in accordance with the date each rating was provided (i.e., chronologically), from the latest to the oldest. Thus, the rows and columns of the table 230 display information regarding specific transactions and associated ratings and comments. The table 230 is organized in columns that include:

(1) a rating column 231 for listing ratings;
(2) a comment column 232 for listing comments;
(3) a participant column 233 for listing the name/handle of the participant who provided the rating, as well as the side of the transaction of that participant (purchaser or vendor, for example);
(4) a date column 234 for listing the date of the particular rating/comment combination provided; and
(5) an item column 235 for identifying the item associated with the rated transaction.

Each transaction corresponds to a specific row in the table 230. Thus, the profile shows information regarding the most recent rating. Here, the most recent rating is favorable ("+"), and the associated comment is "++++++," provided by a purchaser EZGoing1965 on Sep. 26, 2006, regarding a transaction involving an item identified as "A123098." The data shown in the fields of the columns of the table 230 may be hyperlinked. For example, clicking on a particular name of the participant in the column 233 may cause the system to display the profile of that participant. Similarly, clicking on a particular item in the column 235 may display information regarding the item, such as the item's price.

The display shown in FIG. 2A is a contiguous subset of the reviews that may (and in the illustrated example, does) continue on one or more additional pages, for example, listing additional transactions with associated ratings and comments. The pages can be navigated using buttons 260, for example, going to an immediately previous page by clicking on Previous, going to an immediately following page by clicking on Next, or by jumping to a selected page of the button corresponding to the selected page's number appearing among the buttons 260 (pages 1 through 9 of the profile). In FIG. 2A, the Previous button is greyed out because the page appearing in the Figure is the first page of the ratings; the Next button is bolded and underlined, indicating that it can be clicked on or otherwise activated.

Among the ratings shown in FIG. 2A, only one is a negative (unfavorable) rating. The viewer of the page would need to view page after page to find negative or neutral ratings interspersed among the great majority of positive (favorable) ratings, and to review the comments associated with the negative ratings. To facilitate this task, the display shown in FIG. 2 further includes buttons 250 and 255. When the button 250 is activated (e.g., clicked on), the system 100 re-sorts the rows of the table 230 to display the transactions in the order of ratings, from most favorable to most unfavorable. When the button 255 is activated, the system 100 re-sorts the rows of the table 230 to display the transactions in the order of ratings, from most unfavorable to most favorable.

Figure 2B:
FIG. 2B illustrates an exemplary display of a page with the profile of the market participant with a non-default order of ratings, beginning with the least favorable ratings, in accordance with selected embodiments of the present invention.

FIG. 2B shows the display after the button 255 has been activated and the system 100 re-sorted the rows of the table 230 in order of the ratings, beginning with the least favorable. The rows with the same ratings here appear in chronological order, most recent first; this, however, is also not a requirement of the invention, for other ordering within each rating category are possible. If the viewer were to page down through all the negative ratings, neutral ratings would be displayed next, then followed by the favorable ratings. In embodiments with more than one intermediate rating, the intermediate ratings may be displayed in ascending order, beginning with the least favorable of the intermediate ratings. In embodiments with a "star" rating system in which between one star (least favorable) and five star (most favorable) ratings, one star ratings may be displayed first, followed by two star ratings, three star ratings, four star ratings, and five star ratings. If the button 250 is activated, then rows with the most favorable ratings would be displayed first, followed by rows with consecutively less and less favorable ratings. In embodiments with the "star" rating system mentioned earlier in this paragraph, rows with five star ratings would be displayed first, followed by rows with four star ratings, three star ratings, two star ratings, and one star ratings.

Selection of the desired sorting scheme may be accomplished using any known technique, for example, radio buttons and dialog boxes. Furthermore, the system 100 may enable the user/viewer to select sorting and the resulting display beginning with all ratings within a ratings range. For example, the system may display all unfavorable and neutral ratings together, without distinguishing between unfavorable and neutral ratings, then followed by favorable ratings; within the display, the unfavorable and neutral ratings may be sorted chronologically. Thus, a first neutral rating that is most recent of all the unfavorable and neutral ratings may be displayed in the first row, a first unfavorable rating may be displayed second if the first unfavorable rating is second most recent of all the unfavorable and neutral ratings, and so on until the oldest rating from among all the unfavorable and neutral ratings is displayed. Then, the favorable ratings may be displayed in chronological order.

More generally, all available ratings may be split into two or more rating categories, and then sorted chronologically within each category. Each category may include one or more than one distinct ratings. The ratings are then displayed by categories, as selected by the user/viewer. Thus, in embodiments in accordance with the five star system discussed above, the user may be enabled to create a first category with one and two star ratings, a second category with three and four star ratings, and a third category with five star ratings, and then cause the system 100 to display the entries category by category in any order. This of course is a non-limiting example; fewer and more than three categories may be used, and each category may include one or more star ratings.

FIG. 3A shows a display of a page with user ratings and comments related to a hypothetical camera Opti101, which may be generated by a variant of the system 100 used for online commerce. The page includes the name of the product, manufacturer, price, a hyperlink for ordering the product, technical description, picture, and a number of reviews. Each review includes a comment and a rating with one to five stars. The reviews are listed in a chronological order, latest first, which is the default sorting order. The viewer of the page can click on a button 340 to load the next review page in the current (chronological) order. As has already been noted, the less favorable ratings often carry more meaningful information, but such ratings are encountered with lower frequency. Thus, this variant includes buttons 350 and 360 on the page shown in FIG. 3A. Clicking on the button 350 causes the system to display reviews beginning with the highest star number, which is five in this example; clicking on the button 360 causes the system to display reviews beginning with the lowest star number, which is one in this example. The latter case is illustrated in FIG. 3B, which shows reviews beginning with the lowest ratings.

Figure 4:
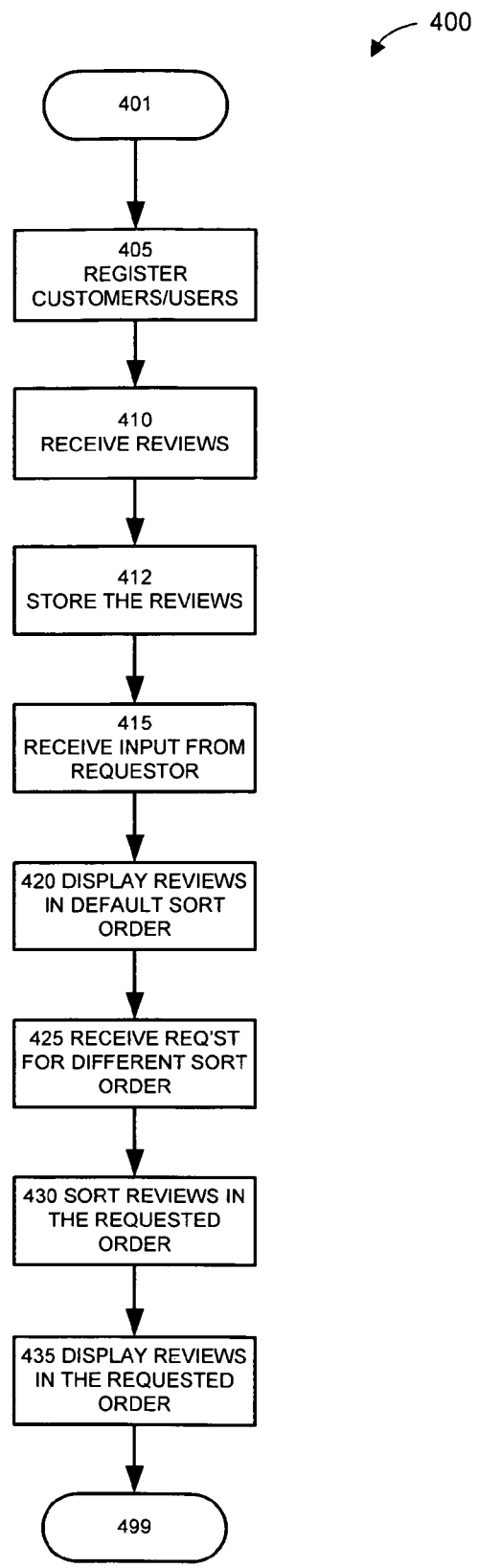
FIG. 4 illustrates selected steps of a process for rating-based sorting and displaying of reviews, in accordance with selected embodiments of the present invention.

FIG. 4 is a process flow diagram illustrating selected steps and decision blocks of a process 400 in accordance with aspects of the present invention. The process 400 may be performed, in whole or in part, by the system 100 of FIG. 1, for example. The process 400 may also be performed by various other systems. Although the process steps and decisions are described serially, certain steps and decisions may be performed by separate elements in conjunction or in parallel, asynchronously or synchronously, in a pipelined manner, or otherwise. There is no particular requirement that the steps and decisions be performed in the same order in which this description lists them or Figures show them, except where a specific order is inherently required, explicitly indicated, or is otherwise made clear from the context. Furthermore, not every illustrated step and decision block may be required in every embodiment in accordance with the invention, while some steps and decision blocks that have not been specifically illustrated, may be desirable or necessary in some embodiments in accordance with the invention. It should be noted, however, that a specific variant uses the order in which the steps are shown and described.

At flow point 401, the system 100 is properly configured and ready to perform the steps of the process 400. In step 405, the system registers customers/users. The customers may be at the customer computers 180 connected to the system 100 via the network 190, as is illustrated in FIG. 1. Registration entails, for example, obtaining a customer's name, postal address, email address, telephone number, bank/credit card information, and product preference information. Legal disclosures, disclaimers, and contract terms governing the customer's relationships with the operator of the system may also be presented. The responses received from the customers and records indicating which documents have been provided to the customers may be stored in the database 160.

In steps 410 and 412, respectively, the system 100 receives reviews from the registered customers, and stores the reviews in the database 160. Each review includes a rating and a comment, and relates to a product, service, or market participant. The customers may be market participants.

In step 415, the system 100 receives an input (request) from a person interested in a given product, service, or market participant. The requesting person (requestor) may be at one of the computers 180.

In step 420, the system 100 displays to the person a first page of the reviews, such as web pages shown in FIGS. 2A and 3A. The displayed reviews are sorted in a predetermined (default) order, for example, chronologically. The displayed page includes a button or similar means for changing the order in which the reviews are displayed, such as the buttons 250 and 255 in the FIG. 2A, and the buttons 350 and 360 in the FIG. 3A.

In step 425, the system 100 receives an input from the requesting person; the input indicates a different (non-default) order of sorting the reviews. For example, the input may indicate that the viewer wishes to see the reviews beginning with the least favorable, sorted in chronological order within each rating category.

In step 430, the system 100 resorts the reviews in the order requested by the requesting person.

In step 435, the system 100 displays first page of reviews in the order requested. For example, the system 100 may display the pages shown in FIG. 2B or 3B.

The process 400 may continue to receive additional inputs from the requesting person and other users, and responding to the inputs, or the process may terminate at flow point 499, as is shown in FIG. 4.

This document describes in considerable detail the inventive apparatus, methods, and articles of manufacture for rating-based searching, sorting, and displaying. This was done for illustration purposes only. Neither the specific embodiments of the invention as a whole, nor those of its features limit the general principles underlying the invention. The specific features described herein may be used in some embodiments, but not in others, without departure from the spirit and scope of the invention as set forth herein. Various physical arrangements of components and various step sequences also fall within the intended scope of the invention. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is carried out by the claims and their equivalents.

I claim:

1. A computer-implemented method of displaying data, the method comprising:

receiving from a plurality of customers reviews for a plurality of subjects, each subject of the plurality of subjects being selected from a group consisting of a product, a service, and a market participant, said plurality of subjects comprising a first subject, the customer reviews comprising a first plurality of reviews for the first subject, each review of the first plurality of reviews comprising a rating of the first subject and a comment associated with the first subject, a single customer of the plurality of customers per review of the first plurality of reviews;

sorting the first plurality of reviews in a default order to obtain a default ordered first plurality of reviews;

causing at least a first subset of the default ordered first plurality of reviews to be displayed on a first display page, the first display page comprising a first input for requesting a first non-default ordered display of the first plurality of reviews in accordance with a first non-default order, the first non-default order being based on ratings in the reviews of the first plurality of reviews, the first non-default order being different from the default order, the first subset comprising a plurality of contiguous reviews;

receiving through the first input a first request for the first non-default ordered display of the first plurality of reviews;

sorting the first plurality of reviews in the first non-default order to obtain a first non-default ordered first plurality of reviews; and in response to the first request, causing to be displayed on a second display page at least a second subset of the first non-default ordered first plurality of reviews, the second subset comprising a plurality of contiguous reviews;

wherein the steps of receiving from the plurality of customers reviews, sorting the first plurality of reviews in the default order, causing at least the first subset of the default ordered first plurality of reviews to be displayed, receiving through the first input the first request, sorting the first plurality of reviews in the first non-default order, and causing to be displayed on the second display page are performed by one or more computers.

2. A method according to claim 1, wherein the default order is chronological beginning with the latest review, and the first non-default order is rating-based with a review having a most favored rating being ordered ahead of a review having a least favored rating.

3. A method according to claim 1, wherein the default order is chronological beginning with the latest review, and the first non-default order is rating-based with a review having a least favored rating being ordered ahead of a review having a most favored rating.

4. A method according to claim 3, wherein the first subject comprises a profile of a first market participant.

5. A method according to claim 3, wherein the first subject comprises a product.

6. A method according to claim 3, wherein the first subject comprises a service.

7. A method according to claim 1, wherein the first display page further comprises a second input for requesting a second non-default ordered display of the first plurality of reviews in accordance with a second non-default order, the second non-default order being different from the default order and from the first non-default order.

8. A method according to claim 1, wherein each rating in the first plurality of reviews is selected from a group consisting of a favorable rating selection and an unfavorable rating selection.

9. A method according to claim 1, wherein each rating in the first plurality of reviews is selected from a group consisting of a favorable rating selection, an unfavorable rating selection, and an intermediate rating selection.

10. A method according to claim 1, wherein each rating in the first plurality of reviews is selected from a group consisting of a first rating selection, a second rating selection, and a third rating selection.

11. A method according to claim 10, wherein the first non-default order is such that each review of the first plurality of reviews that has a first rating selection or a second rating selection is placed ahead of each review of the first plurality of reviews that has a third rating selection, and wherein the reviews of the first plurality of reviews that have first or second rating selections are ordered chronologically.

12. A method according to claim 1, wherein the second display page further comprises a third input for requesting a second non-default ordered display of the first plurality of reviews in accordance with a second non-default order, the second non-default order being different from the default order and from the first non-default order, the method further comprising:
    after the step of causing to be displayed on the second display page, receiving through the third input a second request for the second non-default ordered display of the first plurality of reviews;
    sorting the first plurality of reviews in the second non-default order of the first plurality of reviews to obtain a second non-default ordered first plurality of reviews; and
    in response to the second request, causing to be displayed at least a third subset of the second non-default ordered first plurality of reviews on a third display page, the third subset comprising a plurality of contiguous reviews.

13. A method according to claim 1, wherein each rating in the first plurality of reviews is selected from a group comprising a mutually withdrawn rating selection.

14. An article of manufacture comprising one or more memory devices storing computer code, wherein the code, when executed by at least one processor coupled to the Internet, configures the processor to perform a method comprising:
    receiving from a plurality of customers reviews for a plurality of subjects, each subject of the plurality of subjects being selected from a group consisting of a product, a service, and a market participant, said plurality of subjects comprising a first subject, the customer reviews comprising a first plurality of reviews for the first subject, each review of the first plurality of reviews comprising a rating of the first subject and a comment associated with the first subject, a single customer of the plurality of customers per review of the first plurality of reviews;
    sorting the first plurality of reviews in a default order to obtain a default ordered first plurality of reviews;
    causing at least a first subset of the default ordered first plurality of reviews to be displayed on a first display page, the first display page comprising a first input for requesting a first non-default ordered display of the first plurality of reviews in accordance with a first non-default order, the first non-default order being based on ratings in the reviews of the first plurality of reviews, the first non-default order being different from the default order, the first subset comprising a plurality of contiguous reviews;
    receiving through the first input a first request for the first non-default ordered display of the first plurality of reviews;
    sorting the first plurality of reviews in the first non-default order to obtain a first non-default ordered first plurality of reviews; and
    in response to the first request, causing to be displayed on a second display page at least a second subset of the first non-default ordered first plurality of reviews, the second subset comprising a plurality of contiguous reviews.

15. A computer system comprising a memory device storing computer code, at least one processor coupled to the memory device so as to execute the computer code, and a network interface coupling the at least one processor to the Internet, wherein the computer code, when executed by the at least one processor, configures the at least one processor to perform steps of a method comprising:
    receiving from a plurality of customers reviews for a plurality of subjects, each subject of the plurality of subjects being selected from a group consisting of a product, a service, and a market participant, said plurality of subjects comprising a first subject, the customer reviews comprising a first plurality of reviews for the first subject, each review of the first plurality of reviews comprising a rating of the first subject and a comment associated with the first subject, a single customer of the plurality of customers per review of the first plurality of reviews;
    sorting the first plurality of reviews in a default order to obtain a default ordered first plurality of reviews;
    causing at least a first subset of the default ordered first plurality of reviews to be displayed on a first display page, the first display page comprising a first input for requesting a first non-default ordered display of the first plurality of reviews in accordance with a first non-default order, the first non-default order being based on ratings in the reviews of the first plurality of reviews, the first non-default order being different from the default order, the first subset comprising a plurality of contiguous reviews;
    receiving through the first input a first request for the first non-default ordered display of the first plurality of reviews;
    sorting the first plurality of reviews in the first non-default order to obtain a first non-default ordered first plurality of reviews; and
    in response to the first request, causing to be displayed on a second display page at least a second subset of the first non-default ordered first plurality of reviews, the second subset comprising a plurality of contiguous reviews.

16. A computer system comprising a memory device storing computer code, at least one processor coupled to the memory device so as to execute the computer code, and a network interface coupling the at least one processor to the Internet, wherein the computer code, when executed by the at least one processor, configures the at least one processor to perform steps of a method comprising:
    receiving from a plurality of customers a plurality of reviews relating to a subject, each review of the plurality of reviews comprising a user rating of the subject and a user comment associated with the subject, a single customer of the plurality of customers per review of the plurality of reviews;
    causing the first plurality of reviews to be displayed in a default order;
    causing the plurality of reviews to be displayed in a non-default order in response to a customer request, the non-default order being different from the default order, the non-default order being based on the user ratings in the reviews.

17. A computer system according to claim 16, wherein the non-default order is such that reviews with unfavorable ratings are displayed before reviews with favorable ratings.

* * * * *